United States Patent [19]

Yamamoto

[11] Patent Number: 5,220,438
[45] Date of Patent: Jun. 15, 1993

[54] FACSIMILE APPARATUS HAVING A MEMORY ERASE FUNCTION

[75] Inventor: Susumu Yamamoto, Saitama, Japan

[73] Assignee: Fuji Xerox Co., Ltd., Tokyo, Japan

[21] Appl. No.: 765,190

[22] Filed: Sep. 25, 1991

[30] Foreign Application Priority Data

Nov. 15, 1990 [JP]  Japan .................................. 2-309256

[51] Int. Cl.⁵ ............................................. H04N 1/32
[52] U.S. Cl. ..................................... 358/404; 358/444
[58] Field of Search ................... 358/442, 444, 403–405

[56] References Cited

U.S. PATENT DOCUMENTS

4,800,431  1/1989  Deering ............................... 358/404
4,841,373  6/1989  Asami et al. ......................... 358/404
4,907,094  3/1990  Mishima et al. ..................... 358/404

Primary Examiner—Stephen Brinich
Attorney, Agent, or Firm—Finnegan, Henderson, Farabow, Garrett & Dunner

[57] ABSTRACT

A facsimile apparatus having a memory for storing received data therein and a recorder for printing out image signals, comprises a retaining unit for causing the memory to retain the received data after the image signal has been printed out, an operation unit for instructing to erase the stored data in the memory, and a deletion order storage unit for storing an order of deletion of the stored data, whereby the received data stored in the memory is retained until the operation unit instructs to erase the received data.

3 Claims, 7 Drawing Sheets

FACSIMILE APPARATUS HAVING A MEMORY ERASE FUNCTION

BACKGROUND OF THE INVENTION

The present invention relates to a facsimile apparatus and more particularly to a facsimile apparatus having a memory function. The invention provides a facsimile apparatus in which received code data is prevented from being lost so as to ensure a printout thereof.

With recent improvements in the picture quality of facsimile apparatuses, the conventional thermally-printed paper type printer where the paper is thermally printed, is being replaced by the non-thermally printed paper type printer where ordinary paper is used. The non-thermally-printed paper type printer employs the thermally-transferring method, xerography method were laser is used, or ink jet method where ink is used.

The facsimile apparatus of the aforementioned types which have a memory function are so constructed that the received code data is stored in a memory, the code data is then read out of the memory and is expanded to be the image data to be printed out, and finally the received data in the memory is erased.

The non thermally-printed paper type printer performs a printout operation in a complex process which is not very reliable. For example, the xerography method suffers from the problem that when contact failure occurs electric power may not supplied to a colotron such as a charged colortron, in which case the apparatus is unable to properly reproduce the received image. Unlike a copying machine, a facsimile apparatus is often not attended by an operator while the apparatus is operative. The malfunction of a printer causes the image to be printed out with a poor quality or a non-printed paper to be outputted and the received code data is simply lost afterwards. Therefore, the receive image may not be faithfully reproduced despite the fact that the communication is operating normally. In such a case, the sender must be identified in the transmission/receipt report and the operator must ask the sender to resend the document. This is quite a nuisance.

SUMMARY OF THE INVENTION

An object of the present invention is to eliminate the aforementioned drawbacks of the prior art apparatuses. The invention provides a facsimile apparatus in which, even when the received image is not properly reproduced due to the malfunction of a recorder, the received data is not lost so that the reproduction of the image can be again performed.

In order to achieve the aforementioned object, the facsimile apparatus according to the invention comprises a memory for storing the received code data, a recorder for printing out the image signals stored in the memory, means for causing the memory to retain the received data after the image signal from the memory has been printed out, an operation panel having means for releasing and storing the received data in the memory, and erasing order storage means for storing the order in which the stored received data are erased.

According to this invention, when the facsimile apparatus begins to receive the data, the memory starts to store the received data therein. When the reception of the image signal has been completed, the image signal is read out from the memory and is supplied to the recorder which in turn prints out that image signal. The code data remains held in the memory even after the image signal has been printed out, so that when the memory receives a command indicative of the releasing of the received data from the operation panel, the received data is erased.

Thus, even if the received image is not reproduced with good quality due to the trouble of the recorder when the image is printed out after reception of the image, the image signal may be again printed out at a later time after the recorder has been repaired. This solves the drawbacks of the prior art apparatus that the received data is lost after printout operation.

Further, the facsimile apparatus according to the invention, comprises time-out timer means for determining whether it is the time to erase the storage of the received data, and means for erasing the storage of the received data in the memory when the time-out timer means recognizes that it is the time to release the stored received data.

Furthermore, the facsimile apparatus according to the invention comprises means for erasing the stored received data in a predetermined order when there is no memory area available in the memory means.

DESCRIPTION OF PREFERRED EMBODIMENT

Figure 2:
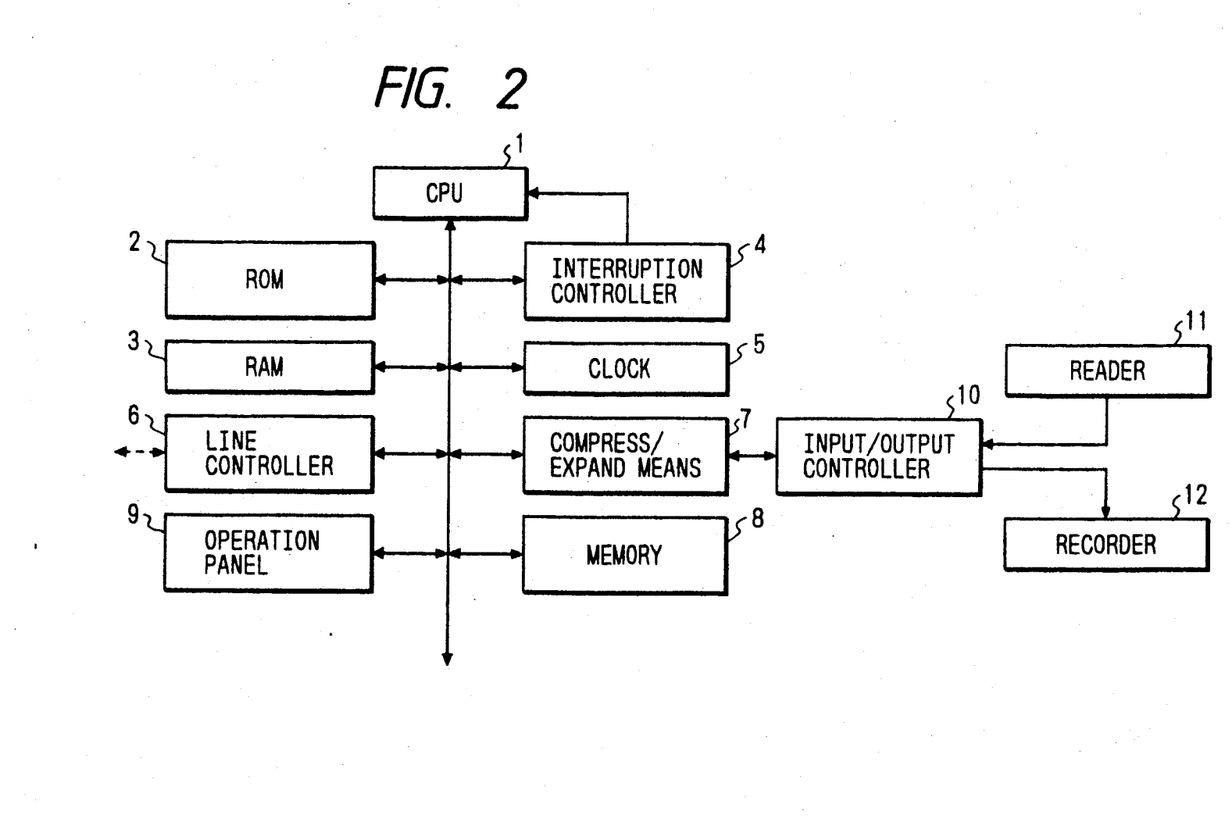
FIG. 2 is a block diagram showing a hardware construction of a facsimile apparatus to which the present invention is applied.

The present invention will now be described with reference to the drawings. FIG. 2 is a block diagram of a facsimile apparatus according to the present invention showing a hardware construction thereof. In the figure, reference numeral 1 denotes a CPU for controlling the system, and reference numeral 2 denotes a ROM in which a system control program is stored. Reference numeral 3 is a RAM which provides a work area and storage for system data, reference numeral 4 is an interruption controller, and reference numeral 5 is a clock. Reference numeral 6 denotes a line controller which forms a line exchange system to handle protocol, reference numeral 7 denotes a compress/expand means for compressing the image signal to reduce the redundancy of the image signal and for expanding the thus compressed image signal, reference numeral 8 is a memory for storing the compressed image signal therein, and reference numeral 9 denotes an operation panel having a ten key pad, abbreviated dialing keys, function keys for various functions, and display. Reference numeral 10 is an input/output controller formed of primarily a buffer memory, reference numeral 11 denotes a reader for reading information from an original, and reference numeral 12 denotes a recorder for printing out the received image.

The image signal received via the line controller 6 is once expanded by the compress/expand means 7, is then subjected to error check, and is stored into the memory 8 with the compressed data. Then, the code data is read out form the memory 8 and expanded by the compress/expand means 7, and then the expanded image signal is supplied to the recorder 12 through the input/output controller 10. The recorder 12 prints out the thus received image signal.

In the present invention, the received code data stored in the memory 8 is not erased shortly after the code data is read out of the memory 8 and the image data expanded from the code data is printed out, but is erased when certain predetermined conditions are met, so that the received code data is not lost even if the recorder 12 fails to properly print out.

Figure 1:
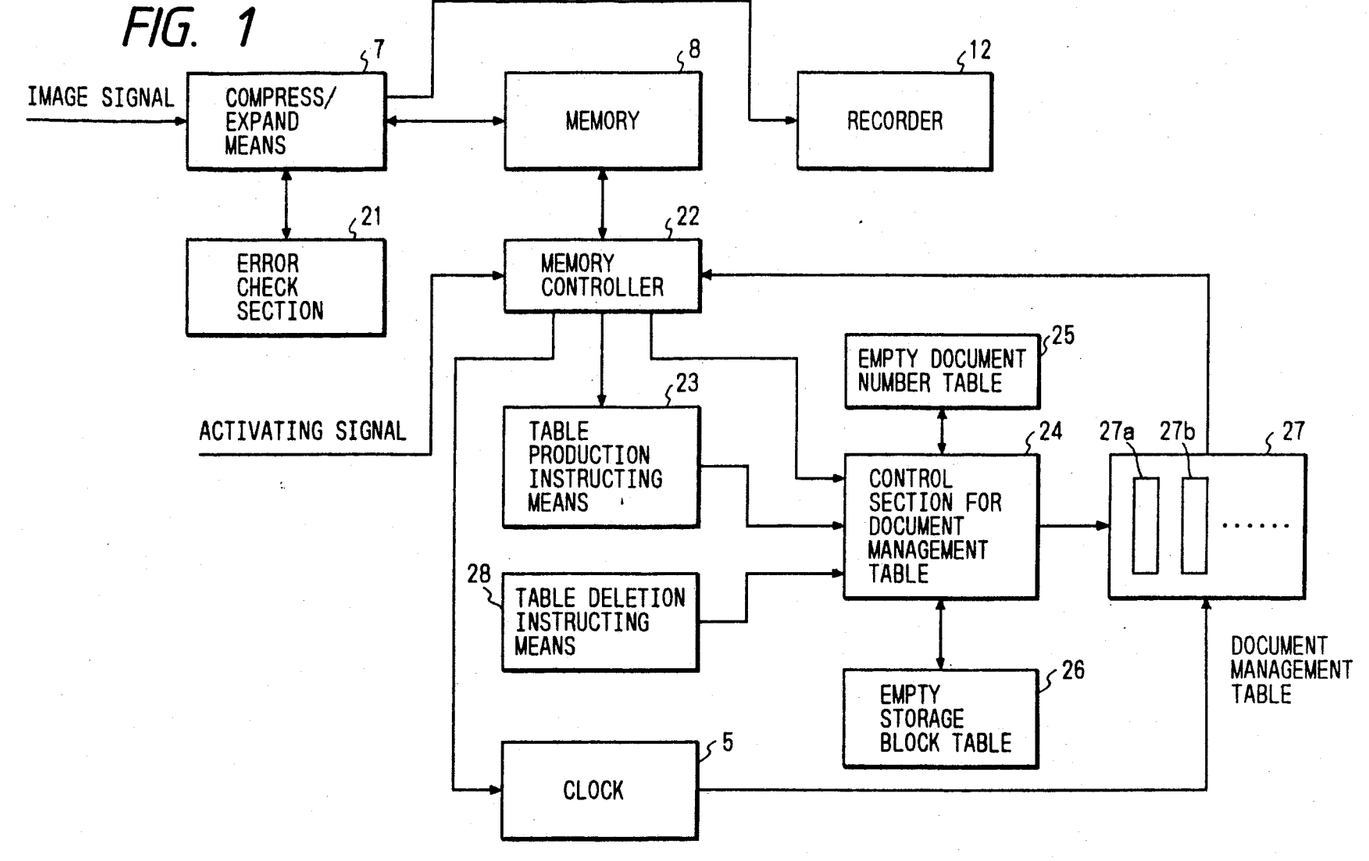
FIG. 1 is a function block diagram of an embodiment of the present invention.

An embodiment of the invention will now be described below. FIG. 1 is a functional diagram of a first embodiment of the invention. Elements in FIG. 1 which are similar to those in FIG. 2 have been given similar reference numerals.

Reference numeral 21 is an error check section where the received code data is expanded by the compress/expand means 7 so as to check the signal in terms of an EOL (end of line) signal of one line and the number of bits in one line.

Reference numeral 22 is a memory controller provided with the functions of controlling the writing of data into and reading of data from the memory 8 as well as the function of detecting the present state of memory 8. Reference numeral 23 denotes a table producing instructing means. Reference numeral 24 is the control section for a document-management table which has a function in which upon reception of a document-management producing instruction from the table production instructing means 23, an empty document number is retrieved from an empty-document-number table 25 and a document management table 27 is produced from the empty document number. The control section for a document management table 24 further has the function in which an empty storage block is retrieved from an empty storage block table 26 and is registered to the document management table 27. The control section for a document-management table 24 has yet another function in which when the table deletion instructing means 28 issues a instruction for deleting the document management table 27, the document number of the document management table 27 is returned to the empty-document-number table 25 and the storage block registered in the document management table 27 is returned to the empty storage block table 26. Reference numeral 5 denotes a clock which provides time information to be recorded in the document management table 27. The document management table 27 represents a group of the document management tables 27a, 27b, ..., which will be described later with reference to FIG. 3.

Figure 3:
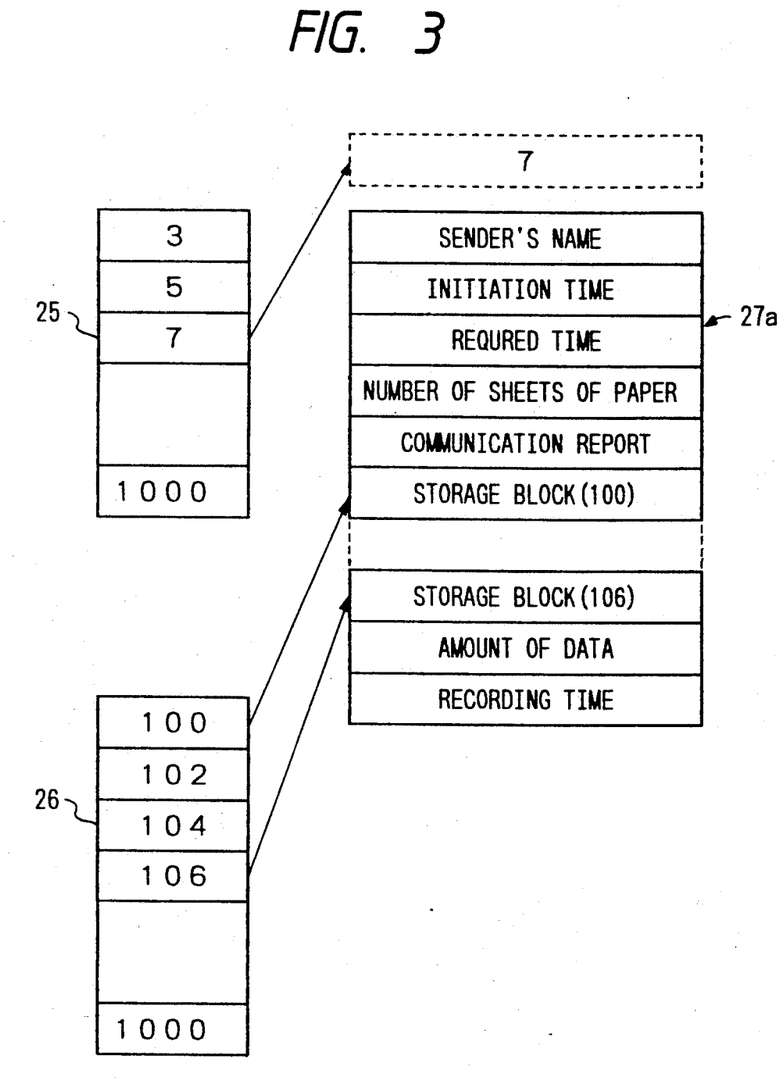
FIG. 3 is shows a general concept of an empty document number table, empty storage block table, and document supervising table.

FIG. 3 shows examples of the empty-document-number table 25, empty-storage-block table 26, and document management table 27a. As shown in FIG. 3, the empty-document-number table 25 is a table in which an unused document-number table is registered, and the empty-storage-block table 26 is a table in which an empty storage block or an unused storage block is registered. A fixed address of the memory 8 is stored in this storage block. Therefore, once a storage block is determined, the storage address of an image signal in the memory 8 is determined. In this embodiment, the memory 8 has a storage capacity of 1 Mbyte and the storage block refers to one kilobyte of addresses; thus the number of storage blocks is 1,000.

As shown in FIG. 3, the document management table 27a is created by specifying a document number (e.g., the document number "7" in the figure). The table document management table 27a includes the name of a sender, the time at which reception is started, the time required for reception, the number of sheets of paper, a communication report, a storage-block number, the amount of data of a received image signal, and a record time or time at which the recorder 12 has completed its printout operation.

Figure 4:
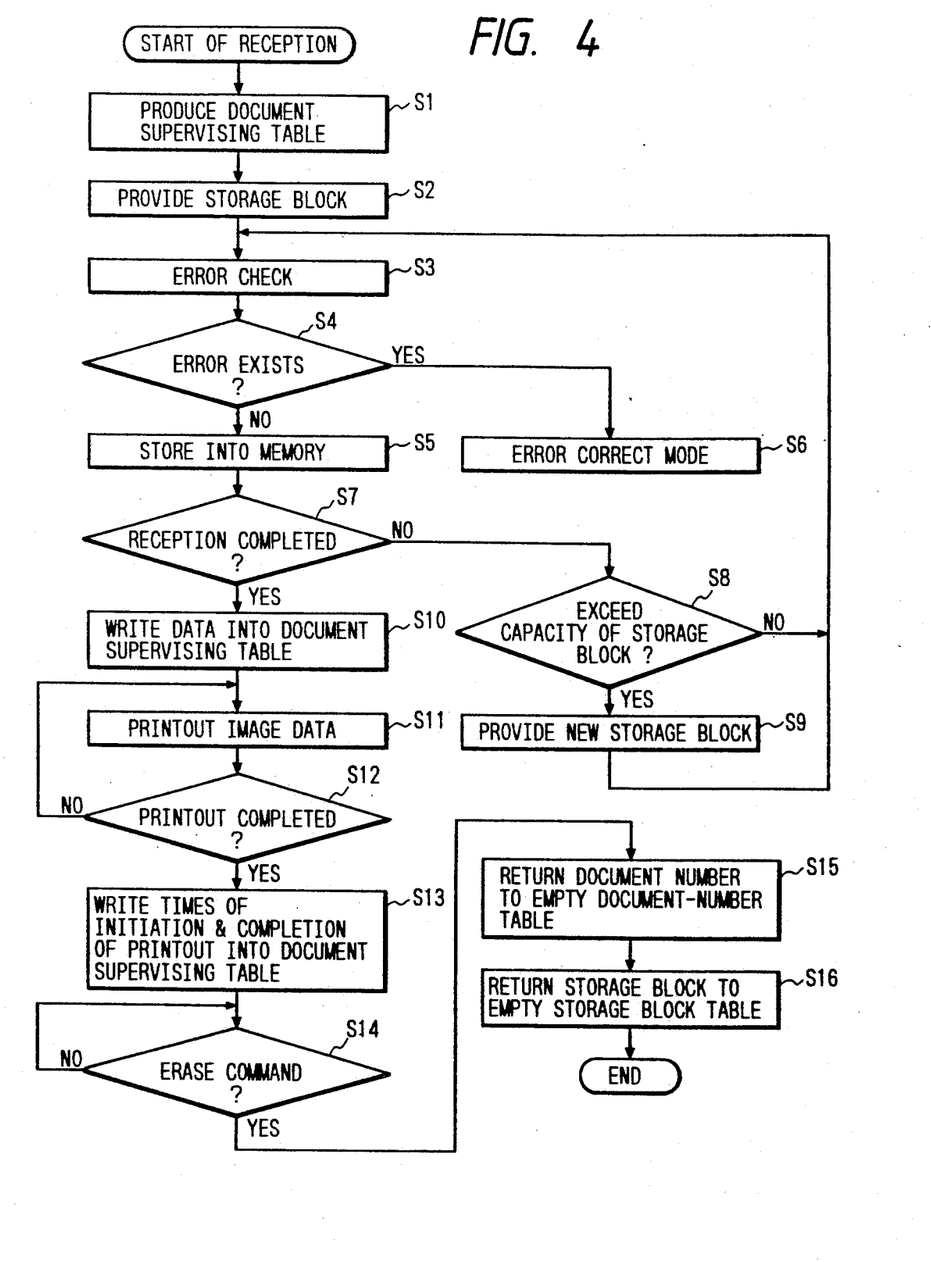
FIG. 4 is a flowchart illustrating the operation of a first embodiment.

The operation of the foregoing embodiment will now be described with reference to FIG. 4 which shows a flowchart illustrating an essential part of the embodiment.

When the facsimile apparatus starts to receive data, an actuating signal is supplied to the memory controller 22. The memory controller 22 sends a signal to the table production instructing means 23 in response to the activating signal and then the table production instructing means 23 sends an instruction indicative of the production of a document management table to the control section for document-management table 24. The control section for document-management table 24 takes one document number from the empty-document number table 25 and produces a document management table 27a on the basis of the document number. In this manner, one document management table 27a is produced (step S1).

Then, the control section for document-management table 24 takes one storage block from the empty-storage-block table 26 and registers it to the document management table 27a (step S2). The memory controller 22 specifies the address registered in this storage block as a write address in the memory 8. Then, the image signal is expanded by the compress/expand means 7 to subsequently be checked for errors by the error check section 21. If the image signal is proven to be normal, then the image signal is stored at the aforementioned address in the memory 8 (steps S3–S6). If an error is detected, the program proceeds to step where the error correct mode (ECM) operation is performed.

At step S7, it is determined whether or not signal reception has been completed. If signal reception has not been completed, it is determined whether the amount of received data exceeds the capacity (e.g., 1 Kbyte) of the storage block. If the capacity is not exceeded, the program returns to step S3 where the aforementioned signal processing is further carried out. However, if the answer is YES at step S8, the program proceeds to step S9 where a new storage block is provided.

Specifically, when the memory controller 22 informs the control section for document-management table 24 of the fact that the amount of the stored image signal has exceeded the capacity of one storage block, the control section 24 takes a storage block from the empty-storage-block table 26 and registers it to the document management table 27a. Then, the memory controller 22 reads the contents of the document management table 27a to specify an address corresponding to the storage block as a new write address. Thus, the image signal is stored at the newly set address.

As described above, when the received image signal has been stored in the memory 8 and the signal reception has been completed, if the answer at step S7 is YES, the processing proceeds to step S10.

At step S10, data is written into the document management table 27a which includes the sender's name, the beginning time of reception, the time required for communication, the number of sheets of paper, the communication report, and the amount of data of the image signal.

Then, the received code data is read out of the memory 8 and is expanded before being printed out by the recorder 12 (step S11). At step S12, it is determined whether the printout has been completed. If completed, the flow proceeds to step S13 where the time at which the image was recorded is written into the document management table 27a, that is, the time of initiation of the printout and the time of completion of the printout.

Then, it is determined whether the operator keyed in a command for erasing the document management table through the operation panel 9 (refer to FIG. 2). If YES, the processing proceeds to step S15 where an operation is performed to return the document number of the document management table 27a to the empty document-number table 25. When this operation is performed, the storage block registered in the empty-document-number table 25 is returned to the empty-storage-block table 26.

Figure 5:
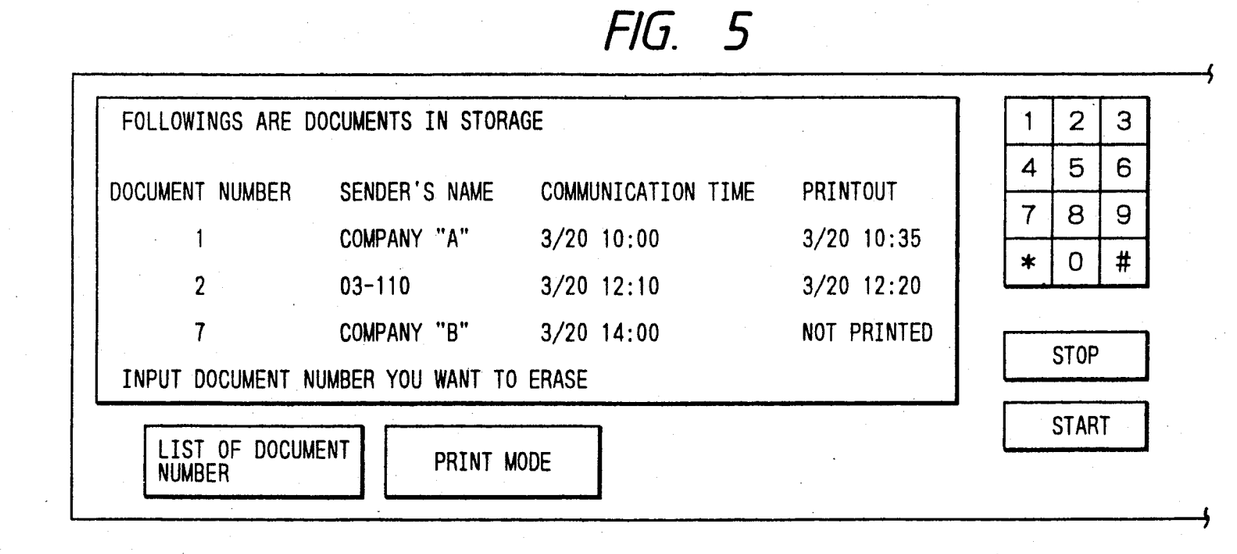
FIG. 5 is a top view of an essential part of an operator control panel.

A specific example will now be described with reference to FIG. 5 where the document management table 27 is erased by the table deletion instructing means 28. FIG. 5 shows a specific example of part Of the operation panel 9.

When the operator presses a key labeled "DOCUMENT-NUMBER LIST", a display image in FIG. 5 appears on the display. In this example, the displays include part of the data registered in the document management table 27, i.e., the document number, the sender's name, the communication the time (time at which the reception begins), and the time at which the image is printed out. When erasing the document number 1 in the document management table 27, the operator inputs "1" with the ten key pad and then presses the key labeled "START" to erase the document number 1 in the document management table 27.

When printing the image signal corresponding to a document number 7, the operator presses the key labeled "PRINT MODE", then inputs "7" with the ten key pad, and finally presses the key labeled "START" to print out the image.

As mentioned above, according to the first embodiment, unless the operator performs the operation for erasing the document number through the operation panel 9, the document management table 27 is not erased and therefore, the corresponding image signal remains in the memory 8. Thus, the image is retained in the memory 8 even if the automatic printout operation is not successfully performed, e.g., when the paper is merely discharged with the received image signal unprinted on the paper. This allows for another printout operation at a later time so that the image signal is printed out after the recorder 12 is repaired.

Figure 6:
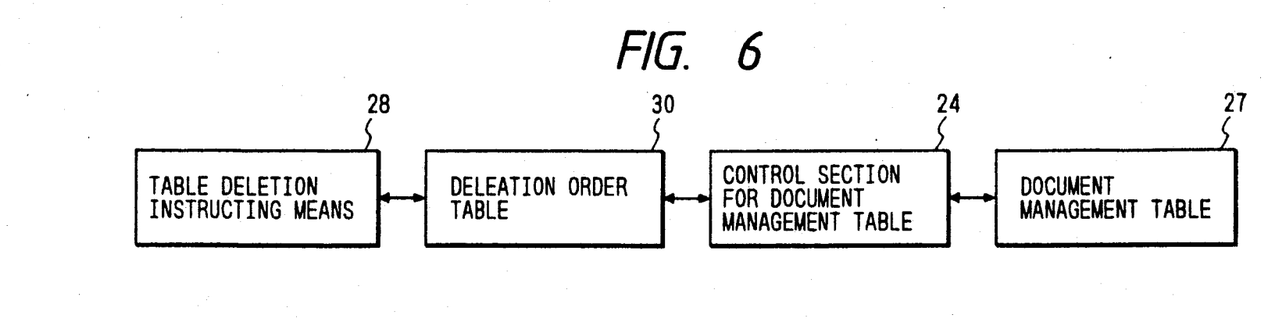
FIG. 6 is a function block diagram of a essential part of a second embodiment.

A second embodiment of the invention will now be described. FIG. 6 is a function block diagram of an essential part of the second embodiment. In FIG. 6, a deletion order table 30 is added between the table deletion instructing means 28 and the control section for document-management table 24 of FIG. 1. The remainder of the configuration (not shown) is the same as or equivalent to that of FIG. 1.

Figure 7:
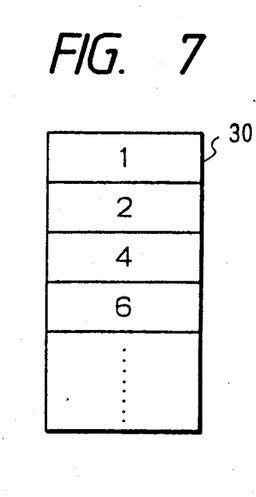
FIG. 7 shows a general concept of the erasure sequence table.

In the deletion order table 30, the document numbers are aligned in descending order in time on the basis of the reception time or record time registered in the document management table 27. FIG. 7 shows an example of the deletion order table 30 where the documents are erased in the order of document numbers 1, 2, 4, 6, ..., etc.

When the operator commands to erase a document table via the table deletion instructing means 28, a first document number in order of deletion which has been registered in the deletion order table 30 is sent to the control section for document-management table 24. When the control section document-management table 24 receives that document number, the control section 24 erases, that document number from the document management table 27. In this manner, document numbers in the document management table 27 are erased. The deletion order table 30 is updated so that the previously second document is now the first document.

As mentioned above, according to the second embodiment, the operator is able to erase image signals in such a way that image signals are erased in order of older reception times or of older record times. Thus, according to the second embodiment, even when nonprinted or poorly printed papers are discharged due to the trouble of the recorder 12, the image may be printed out again at a later time after the recorder 12 has been repaired.

Figure 8:
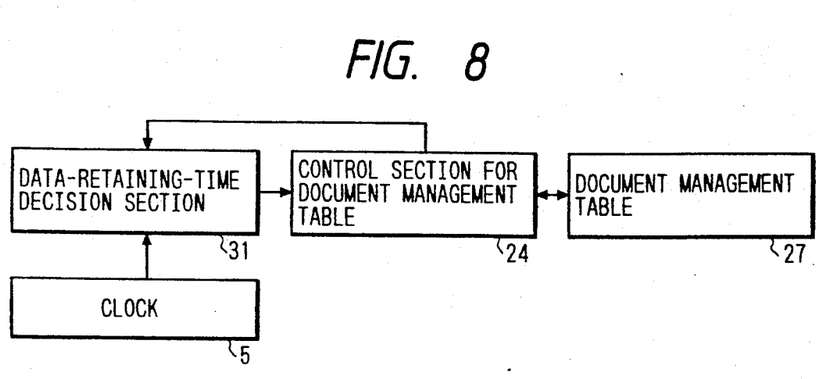
FIG. 8 is a functional block diagram of an essential part of a third embodiment.

A third embodiment of the invention will now be described. FIG. 8 is a function diagram of an essential part of the third embodiment. In FIG. 8, the table deletion instructing means 28 of FIG. 1 has been replaced by a data-retaining-time decision section 31 while the remainder of the configuration (not shown) is the same as or equivalent to that in FIG. 1.

In the third embodiment, a data-retaining-time is added to the document management table 27a in FIG. 3. The data-retaining-time is set by adding a predetermined time, for example, six hours, to the record time.

In FIG. 8, the control section for document-management table 24 reads the data-retaining-time of the respective document management table from the document management table 27 and sends them to the data-retaining-time decision section 31 which, in turn, compares the data-retaining-time with a time from the clock 5 so as to send a deletion signal to the control section for document-management table 24 if it is beyond the data-retaining-time. Upon receiving the deletion signal, the control section for document-management table 24 erases the document number whose data-retaining-time is registered. In this manner, the document number in the document management table 27 is erased.

As mentioned above, according to the third embodiment, the received image signal is retained in the memory 8 until predetermined time has elapsed, so that even when the printing is not carried out normally, the image may be printed out again at a later time after the recorder 12 has been repaired.

Figure 9:
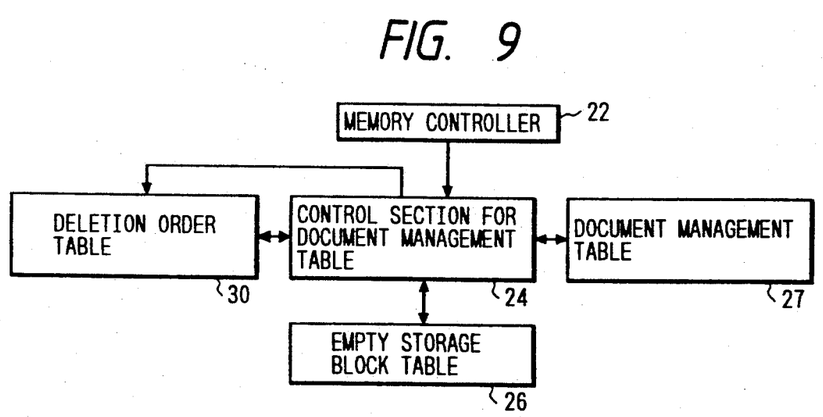
FIG. 9 is a functional block diagram of an essential part of a fourth embodiment.

A fourth embodiment of the invention will now be described. FIG. 9 is a function block diagram of an essential part of the fourth embodiment. The remaining configuration (not shown) is the same as or equivalent to that of FIG. 1.

In the fourth embodiment, when the memory controller 22 requests the control section for document-management table 24 for a new storage block, the memory controller 22 refers to the deletion order table 30, as in the second embodiment, if an empty storage block is not in the empty storage block table 26. The document numbers are erased in the order of higher priority of deletion which are registered in the deletion order table 30, thereby providing an empty storage block.

Figure 10:
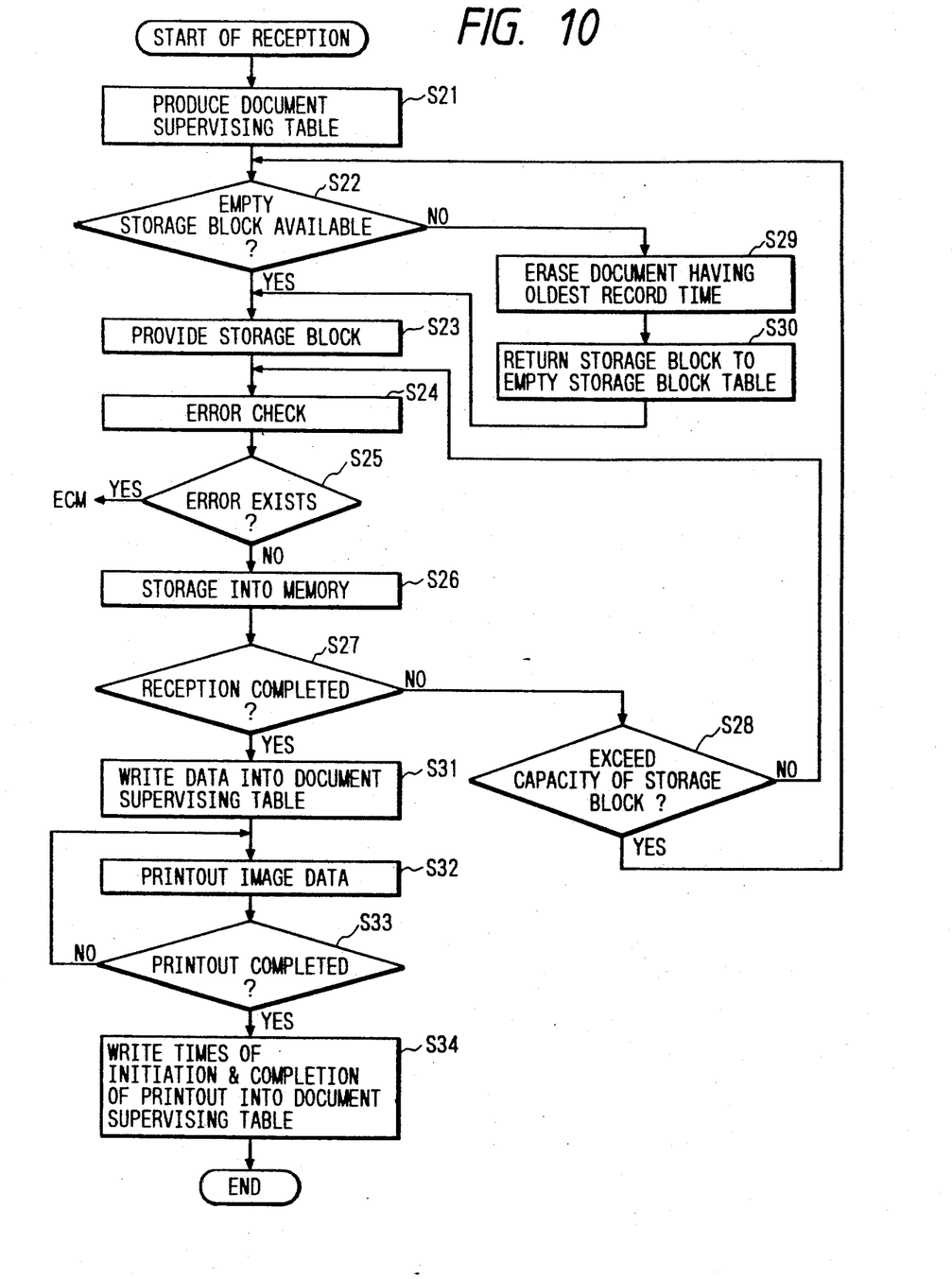
FIG. 10 is a flowchart illustrating the operation of the fourth embodiment.

The operation of the fourth embodiment will now be described with reference to FIG. 10 which illustrates the operation of the fourth embodiment.

Upon starting to receive a signal, the control section for document-management table 24 takes one document number out of the empty-document-number table 25 so as to produce a document management table 27 using that document number. In this manner, the document management table 27 is provided (step S21).

Then, it is determined whether an empty storage block exists (step S22). If YES, a storage block is provided (step S23). Then, a check is made for an error (step S25). If no error exists, the received image signal is stored at an address indicated by the storage block of the memory 8.

Then, at step S27, it is determined whether the reception has been completed. If NO, it is determined whether the amount of received data exceeds the capacity of the storage block (step S28). If NO, the program returns to step S24 where the aforementioned steps are iterated.

However, if the result is YES at step S28, then the program returns to step S22 where a check is made to determine whether an empty block exists. If YES, the program proceeds to step S23 where a new storage block is provided. Meanwhile, if the result is NO at step S22, the control section for document-management table 24 refers to the deletion order table 30 so as to take out a document number of the oldest record time and erase it at step S29.

When the document number is erased, the document management table corresponding to that document is erased. Thus, the storage block where that document management table was registered is returned to the empty storage block table 26 (step S30). Then, the program proceeds to step S23 where a new storage block is supplied from the empty storage block table 26.

Upon completion of the aforementioned steps, if the result is YES at step S27, then the program proceeds to step S31. Steps S31–S34 are the same as steps S10–S13 and a description thereof is omitted.

According to the fourth embodiment mentioned above, when an empty storage block becomes unavailable, an operation is performed to erase a document number having the oldest record time, so that an empty storage block resulting from that operation is now available as a new memory area. Thus, documents are erased in the order of their reception time, so that even when printing is not normally carried out shortly after reception, the image may be printed out again at a later time after the repair of recorder 12 has been completed.

As is apparent from the above description, according to the invention, when performing the printout operation after the received data has been stored in the memory 8 if the printout operation is not carried out normally due to the troubles of the recorder 12 the image signal may be printed out again at a later time after the recorder 12 has been repaired. The received image signal is not lost. This ensures reliable communication.

What is claimed is:

1. A facsimile apparatus, comprising:

memory means for receiving code data and for storing said code data until said memory means receives an erase command;

erasure order storage means for storing an order in which said code data stored in said memory means is to be erased; and operation means for generating said erase command to cause said memory means to erase said code data stored therein in the order stored in said erasure order storage means.

2. The facsimile apparatus of claim 1, wherein said operation means generates said erase command when said memory means is full.

3. The facsimile apparatus of claim 1, wherein said operation means generates said erase command after a selected period of time has elapsed.

* * * * *